(12) United States Patent  (10) Patent No.: US 7,734,752 B2
Zuk et al.  (45) Date of Patent: Jun. 8, 2010

(54) INTELLIGENT INTEGRATED NETWORK SECURITY DEVICE FOR HIGH-AVAILABILITY APPLICATIONS

(75) Inventors: Nir Zuk, Palo Alto, CA (US); Yu Ming Mao, Milpitas, CA (US); Kowsik Guruswamy, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1616 days.

(21) Appl. No.: 10/961,075

(22) Filed: Oct. 12, 2004

(65) Prior Publication Data

US 2006/0005231 A1 Jan. 5, 2006

Related U.S. Application Data

(63) Continuation-in-part of application No. 10/402,920, filed on Mar. 28, 2003, which is a continuation-in-part of application No. 10/072,683, filed on Feb. 8, 2002.

(51) Int. Cl.
G06F 15/16 (2006.01)
G06F 15/173 (2006.01)
G06F 11/00 (2006.01)

(52) U.S. Cl. .......................... 709/223; 709/205; 714/11

(58) Field of Classification Search ................ 709/205, 709/223; 714/11
See application file for complete search history.

(56) References Cited

U.S. PATENT DOCUMENTS

| | | | | |
|---|---|---|---|---|
| 5,598,410 | A | 1/1997 | Stone | 370/469 |
| 5,606,668 | A | 2/1997 | Shwed | 395/200.11 |
| 5,835,726 | A | 11/1998 | Shwed et al. | 395/200.59 |
| 6,006,264 | A | 12/1999 | Colby et al. | 709/226 |
| 6,052,788 | A | 4/2000 | Wesinger, Jr. et al. | |
| 6,119,236 | A | 9/2000 | Shipley | 713/207 |
| 6,205,551 | B1 | 3/2001 | Grosse | |
| 6,253,321 | B1 | 6/2001 | Nikander et al. | 713/160 |
| 6,275,942 | B1 | 8/2001 | Bernhard et al. | 713/201 |
| 6,279,113 | B1 | 8/2001 | Vaidya | 713/201 |
| 6,301,668 | B1 | 10/2001 | Gleichauf et al. | 713/201 |

(Continued)

FOREIGN PATENT DOCUMENTS

EP 1 143 660 10/2001

(Continued)

OTHER PUBLICATIONS

Co-pending U.S. Appl. No. 10/072,683, filed Feb. 8, 2002, entitled "Multi-Method Gateway-Based Network Security Systems and Methods," Nir Zuk et al., 62 page specification, 16 sheets of drawings.

(Continued)

*Primary Examiner*—Rupal D Dharia
*Assistant Examiner*—Tanim Hossain
(74) *Attorney, Agent, or Firm*—Harrity & Harrity, LLP

(57) ABSTRACT

Methods and apparatuses for inspecting packets are provided. A primary security system may be configured for processing packets. The primary security system may be operable to maintain flow information for a group of devices to facilitate processing of the packets. A secondary security system may be designated for processing packets upon a failover event. Flow records may be shared from the primary security system with the secondary security system.

23 Claims, 13 Drawing Sheets

U.S. PATENT DOCUMENTS

| | | | |
|---|---|---|---|
| 6,304,975 B1 | 10/2001 | Shipley | 713/201 |
| 6,311,278 B1 | 10/2001 | Raanan et al. | 713/201 |
| 6,321,338 B1 | 11/2001 | Porras et al. | 713/201 |
| 6,421,730 B1 | 7/2002 | Narad et al. | 709/236 |
| 6,449,647 B1 | 9/2002 | Colby et al. | 709/226 |
| 6,453,345 B2 | 9/2002 | Trcka et al. | 709/224 |
| 6,466,985 B1 | 10/2002 | Goyal et al. | 709/238 |
| 6,487,666 B1 | 11/2002 | Shanklin et al. | 713/201 |
| 6,499,107 B1 | 12/2002 | Gleichauf et al. | 713/201 |
| 6,704,278 B1 * | 3/2004 | Albert et al. | 370/216 |
| 6,768,738 B1 | 7/2004 | Yazaki et al. | |
| 6,788,648 B1 | 9/2004 | Peterson | 370/252 |
| 6,851,061 B1 | 2/2005 | Holland et al. | 726/23 |
| 6,856,991 B1 | 2/2005 | Srivastava | 707/10 |
| 6,981,158 B1 | 12/2005 | Sanchez et al. | 702/188 |
| 7,006,443 B2 | 2/2006 | Storr | 370/236.1 |
| 7,376,085 B2 | 5/2008 | Yazaki et al. | |
| 2002/0032797 A1 | 3/2002 | Xu | 709/238 |
| 2002/0124187 A1 | 9/2002 | Lyle et al. | 713/201 |
| 2002/0161839 A1 * | 10/2002 | Colasurdo et al. | 709/204 |
| 2003/0105976 A1 | 6/2003 | Copeland | 713/201 |
| 2003/0145225 A1 | 7/2003 | Bruton et al. | 713/201 |
| 2003/0149887 A1 | 8/2003 | Yadav | 713/200 |
| 2003/0149888 A1 | 8/2003 | Yadav | 713/200 |
| 2004/0030927 A1 | 2/2004 | Zuk | 713/201 |
| 2005/0198335 A1 * | 9/2005 | Brown et al. | 709/229 |

FOREIGN PATENT DOCUMENTS

| | | |
|---|---|---|
| EP | 1 427 162 | 6/2004 |
| JP | 10-107795 | 4/1998 |
| JP | 11-316677 | 11/1999 |
| JP | 2000-312225 | 11/2000 |
| JP | 2001-313640 | 11/2001 |
| JP | 2003-78549 | 3/2003 |
| WO | WO 03/025766 A1 | 3/2003 |
| WO | 03/061238 | 7/2003 |

OTHER PUBLICATIONS

Stonesoft, "StoneBeat" 'Security Cluster White Paper,' Aug. 2000, Finland, pp. 1-9.

Stonesoft, StoneBeat, 'Secure Highly Available Enterprise-A White Paper,' Feb. 2001, Finland, pp. 1-10.

Stonesoft, 'StoneGate White Paper,' Mar. 2001, Finland, pp. 1-6.

Stonesoft Corp. 'StoneGate,' product webpage, www.stonesoft.com/document/363.html, Mar. 27, 2001 (print date), pp. 1-2.

Stonesoft Corp. 'Next Level of Network Accessibility' webpage, www.stonesoft.com/document/183.html, Mar. 27, 2001 (print date), p. 1.

Stonesoft Corp., 'Platforms,' webpage, www.stonesoft.com/document/186.html, Mar. 27, 2001 (print date), p. 1.

Nokia, 'Technical White Paper: The IP Clustering Power of Nokia VPN-Keeping Customers Connected,' Apr. 2001, pp. 1-13.

Nokia, 'Nokia VPN Solutions—Nokia VPN CC2500 Gateway,' Jan. 1, 2001, product information, pp. 1-2.

Nokia, 'Nokia VPN Solutions—Nokia VPN CC5200 Gateway,' 2001, product information, pp. 1-2.

Nokia, Nokia VPN Solutions—Nokia VPN CC5205 Gateway, 2001, product information, pp. 1-2.

Axelsson, S., "Intrusion Detection Systems: A Survey and Taxonomy," Dept. of Computer Eng., Chalmers Univ. Of Technology, Goteborg, Sweden, Mar. 14, 2000, pp. 1-27.

Avolio, F., "Firewalls and Virtual Private Networks," CSI Firewall Archives, printed Nov. 13, 2001 URL: http://www.spirit.com/CSI/Papers/fw_+_vpns.html, pp. 1-7.

Bace, R., "An Introduction to Intrusion Detection & Assessment," ICSA Intrusion Detection Systems Consortium White Paper, 1999, URL: http://www.icsalabs.com/html/communities/ids/whitepaper/Intrusion1.pdf, pp. 1-38.

Business Wire, Inc., "NetScreen and OneSecure Unite to Deliver Industry's First Total Managed Security Services Platform," San Jose, CA, Feb. 20, 2001, pp. 1-2.

Business Wire, Inc., "OneSecure Launches the First Co-Managed Security Services Platform," Denver, CO, Jan. 29, 2001, pp. 1-2.

Carr, Jim, "Intrusion Detection Systems: Back to Front?," Network Magazine, Sep. 5, 2001, URL: http://www.networkmagazine.com/article/NMG20010823S0007/2, pp. 1-9.

Check Point Software Technologies Ltd., Firewall-1® Technical Overview P/N 500326, www.checkpoint.com, Oct. 2000, pp. 1-29.

Cisco Systems, "Cisco IOS Firewall Intrusion Detection System," Cisco IOS Release 12.0(5)T, 2001, pp. 1-40.

Cisco Systems, "Cisco IOS Firewall Authentication Proxy," Cisco IOS Release 12.0(5)T, 2001, pp. 1-48.

Clark, D., "RFC815-IP Datagram Reassembly Algorithms," Internet RFC/STD/FYI/BCP Archives, http://www.faqs.org/rfcs/rfc815.html, Jul. 1982, pp. 1-8.

Copeland, Dr. John A., "Observing Network Traffic-Techniques to Sort Out the Good, the Bad, and the Ugly," PowerPoint Slide Presentation presented to ISSA-Atlanta, Jun. 27, 2001, pp. 1-22.

Denning, Dorothy E., "An Intrusion-Detection Model," IEEE Transactions on Software Engineering, vol. SE-13, No. 2, Feb. 1987, 17 pages.

Farrow, Rik, "An Analysis of Current Firewall Technologies," CSI 1997 Firewalls Matrix, 1998, URL: http://www.spirit.com/CSI/Papers/farrowpa.htm, pp. 1-5.

Firewall Product Comparison Table: VelociRaptor, BorderWare Firewall Server and Firewall-1/VPN-1 Gateway, www.spirit.com, printed Nov. 13, 2001, pp. 1-7.

Firewall Product Comparison Table: PIX Firewall, CyberGuard Firewall for UnixWare & CyberGuard Firewall for Windows NT, www.spirit.com, printed Nov. 13, 2001, pp. 1-8.

Firewall Product Comparison Table: CyberGuard Premium Appliance Firewall, InstaGate EX & BizGuardian VPN Firewall, www.spirit.com, printed Nov. 13, 2001, pp. 1-8.

Firewall Product Comparison Table: Server Protector 100, GNAT Box Firewall Software & Lucent Managed Firewall, www.spirit.com, printed Nov. 13, 2001, pp. 1-6.

Firewall Product Comparison Table: Internet Security and Acceleration (ISA) Server 2000, NetBSD/i386 Firewall & Guardian Firewall, www.spirit.com, printed Nov. 13, 2001, pp. 1-7.

Firewall Product Comparison Table: NetScreen-10 and NetScreen-100, CyberwallPLUS & BorderManager, www.spirit.com, printed Nov. 13, 2001, pp. 1-7.

Firewall Product Comparison Table: Gauntlet Firewall, Barricade Classic/XL & Barricade S, www.spirit.com, printed Nov. 13, 2001, pp. 1-8.

Firewall Product Comparison Table: Sidewinder™, SecurePipe Managed Firewall Service & SnapGear, www.spirit.com, printed Nov. 13, 2001, pp. 1-7.

Firewall Product Comparison Table: SonicWALL Pro, Sunscreen Secure Net & WinRoute Pro 4.1, www.spirit.com, printed Nov. 13, 2001, pp. 1-6.

Firewall Product Comparison Table: WatchGuard Technologies, Inc. LiveSecurity System 4.6, www.spirit.com, printed Nov. 13, 2001, pp. 1-4.

Graham, R., "FAQ: Network Intrusion Detection System," www.robertgraham.com/pubs/network-intrusion-detection.html, Ver. 0.8.3, Mar. 21, 2000, pp. 1-43.

Habra, N. et al., "ASAX: Software Architecture and Rule-Based Language for Universal Audit Trail Analysis," Proceedings of the ESORICS '92, European Symposium on Research in Computer Security, Nov. 23-25, 1992, Toulouse, Springer-Verlag, 16 pages.

ICSA Labs, "Intrusion Detection System Buyer's Guide," ICSA White Paper, 1999, pp. 1-52.

Jackson, K. et al., "Intrusion Detection System (IDS) Product Survey," Los Alamos National Laboratory, Los Alamos, NM, LA-UR-99/3883 Ver. 2.1, Jun. 25, 1999, pp. 1-103.

Jones, Kyle, "Introduction to Firewalls," ITAudit.org Forum Network Management, vol. 2, May 1, 1999, URL: http://www.itaudit.org/forum/networkmanagement/f209nm.htm, pp. 1-5.

Lancope, "The Security Benefits of a Flow-Based Intrusion Detection System," White Paper, date unknown, pp. 1-11.

LapLink, Inc., "Article #178-Introduction to Firewalls," www.laplink.com/support/kb/article.asp?ID_=_178, Apr. 24, 2001, pp. 1-3.

McHugh, J. et al., "Defending Yourself: The Role of Intrusion Detection Systems," *Software Engineering Institute*, IEEE Software Eng., Sep./Oct. 2000, pp. 42-51.

Network ICE Corporation, "Why Firewalls Are Not Enough," at www.networkice.com/products/firewalls.html, 2000, pp. 1-9.

Power, R., et al., "CSI Intrusion Detection System Resource-Five Vendors Answer Some No-Nonsense Questions on IDS," *Computer Security Alert #184*, Jul. 1998, pp. 1-8.

Power, R., "CSI Roundtable: Experts discuss present and future intrusion detection systems," *Computer Security Journal*, vol. XIV, #1, URL: http://www.gocsi.com/roundtable.htm, 2001, pp. 1-20.

Sample, Char, et al., "Firewall and IDS Shortcomings," SANS Network Security, Monterey, CA, Oct. 2000, pp. 1-13.

Smith, Gary, "A Brief Taxonomy of Firewalls-Great Walls of Fire," SANS Institute's Information Security Reading Room, May 18, 2001, URL: http://www.sans.orq/infosecFAQ/firewall/taxonomy.htm, pp. 1-21.

Spitzner, Lance, "How Stateful is Stateful Inspection? Understanding the FW-1 State Table," http://www.enteract.com/_~1spitz/fwtable.html, Nov. 29, 2000, pp. 1-8.

Sundaram, A., "An Introduction to Intrusion Detection," www.acm.org/crossroads/xrds2-4/intrus.html, Jan. 23, 2001, pp. 1-12.

Tyson, Jeff, "How Firewalls Work," http://www.howstuffworks.com/firewall.htm/printable, 2001, pp. 1-7.

Xinetica, Ltd., "An Overview of Intrusion Detection Systems," Xinetica White Paper, Nov. 12, 2001 (print date), URL: http://www.xinetica.com/tech_explained/general/ids/wp_ids.html, pp. 1-9.

Zuk, Nir, "Protect Yourself With Firewalls," www.techtv.com, Jul. 12, 2001, URL: http://www.techtv.com/screensavers/print/0,23102,3325761,00.html, pp. 1-3.

Zuk, Nir, "How the Code Red Worm Works," www.techtv.com, Sep. 21, 2001, URL: http://www.techtv.com/screensavers/print/0,23102,3349133,00.html, pp. 1-2.

Petersen, S., et al., "Web apps pose security threat," ZDNet: Tech Update, Jan. 29, 2001, URL: http://techupdate.zdnet.com/techupdate/stories/main/0,14179,2679177,00.html, pp. 1-3.

Lancope, "StealthWatch Provides Early Detection of the Code Red Worm and its Future Variants," www.stealthwatch.com, date unknown, pp. 1-4.

Reavis, J., "Cash and BURN," Jun. 2001, 6 pages.

SOS Corporation, "An Introduction to Firewalls," 1995, URL: http://www.uclan.ac.uk/facs/destech/compute/staff/haroun/FIREWALLS.HTM, pp. 1-3.

Morgan, Lisa," Be Afraid, Be Very Afraid," InternetWeek Intrusion Detection Systems, Jan. 3, 2001, pp. 1-6.

Mullins, Robert, "'Cyber war' raises security concerns," *Silicon Valley/San Jose Business Journal*, May 11, 2001, pp. 1-4.

James P. Anderson Co., "Computer Security Threat Monitoring and Surveillance," Apr. 15, 1980, 56 pages.

Internet Security Systems, Inc., "REALSECURE™, The RealSecure Advantage," 2001, 2 pages.

Chuvakin, A., et al., "Basic Security Checklist for Home and Office Users," SecurityFocus, Nov. 5, 2001, pp. 1-5.

Network Ice, "SMTP WIZ command," 2001, URL: http://networkice.com/Advice/Intrusions/2001006/default.htm, pp. 1-2.

Bace, R., et al., "NIST Special Publication on Intrusion Detection Systems," National Institute of Standards and Technology Special Publication, date unknown, pp. 1-51.

European Search Report for European Application No. 05 02 2282, Jan. 11, 2006. 2 pp.

Navarro, A Partial Deterministic Automaton for Approximate String Matching, 1997, Department of Computer Science, University of Chile, 13 pages.

Navarro et al., Improving an Algorithm for Approximate Pattern Matching, 1998, Department of Computer Science, University of Chile, pp. 1-34.

Network Magazine, vol. 2, No. 2, pp. 116-119 (with English abstract).

Software Design, Nov. 1996, pp. 39-58 (with English abstract).

* cited by examiner

INTELLIGENT INTEGRATED NETWORK SECURITY DEVICE FOR HIGH-AVAILABILITY APPLICATIONS

CROSS-REFERENCE TO RELATED APPLICATION

This application is a continuation-in-part of U.S. patent application Ser. No. 10/402,920, filed Mar. 28, 2003, which is a continuation-in-part of U.S. patent application Ser. No. 10/072,683, filed Feb. 8, 2002. Both U.S. patent applications are herein incorporated by reference in their entirety.

FIELD OF THE INVENTION

Systems, apparatuses and methods consistent with the principles of the invention relate generally to controlling computer network security.

BACKGROUND

Firewalls and intrusion detection systems are devices that may be used to protect a computer network from unauthorized or disruptive users. A firewall can be used to secure a local area network from users outside the local area network. A firewall checks, routes, and frequently labels all messages sent to or from users outside the local area network. An intrusion detection system (IDS) can be used to examine information being communicated within a network to recognize suspicious patterns of behavior. Information obtained by the IDS can be used to block unauthorized or disruptive users from accessing the network. An intrusion prevention system (IPS) is an in-line version of an IDS. An IPS can be used to examine information as it is being communicated within a network to recognize suspicious patterns of behavior.

A flow-based router (FBR) can allow network administrators to implement packet forwarding and routing according to network policies defined by a network administrator. FBRs can allow network administrators to implement policies that selectively cause packets to be routed through specific paths in the network. FBRs can also be used to ensure that certain types of packets receive differentiated, preferential service as they are routed. Conventional routers can forward packets to their destination address based on available routing information. Instead of routing solely based on the destination address, FBRs can enable a network administrator to implement routing policies to allow or deny packets based on several other criteria including the application, the protocol, the packet size and the identity of the end system.

A packet filter can operate on the data in the network layer to defend a trusted network from attack by an untrusted network. For example, packet filters inspect fields of the Transmission Control Protocol/Internet Protocol (TCP/IP) header including, the protocol type, the source and destination Internet Protocol (IP) address, and the source and destination port numbers. Disadvantages of packet filters include, slow speed and difficult management in large networks with complex security policies.

A proxy server can operate on values carried in the application layer to insulate a trusted network from an untrusted network. In an application proxy server, two Transmission Control Protocol (TCP) connections may be established: one between the packet source and the proxy server, another between the proxy server and the packet destination. The application proxy server can receive the arriving packets on behalf of the destination server. The application data can be assembled and examined by the proxy server, and a second TCP connection can be opened between the proxy server and the destination server to relay permitted packets to the destination server. Proxy servers can be slow because of the additional protocol stack overhead required to inspect packets at the application layer. Furthermore, because a unique proxy can be required for each application, proxy servers can be complex to implement and difficult to modify for supporting new applications. In addition, because proxy servers only examine application packets, proxy servers may not detect an attempted network security intrusion at the TCP or network layers.

SUMMARY

The present invention provides methods and apparatuses for inspecting packets.

In a first aspect, a method is provided for inspecting packets. The method may include configuring a primary security system for processing packets, where the primary security system is operable to maintain flow information for a group of devices to facilitate processing of the packets, designating a security system for processing packets upon a failover event, and sharing flow records from the primary security system with the secondary security system In a second aspect, a system is provided. The system may include a first apparatus. The first apparatus may include a first security device, a first module operable to maintain flow information associated with packets received from a computer network, and a communication interface operable to permit an exchange of flow records with a second apparatus. The first module is further operable to share device-specific flow information with the first security device.

In a third aspect, a system for inspecting packets is provided. The system may include a primary security apparatus operable to receive and process packets. The primary security apparatus may include means for maintaining flow information for a group of devices included in the primary security apparatus. A secondary apparatus is operable to process packets for the primary security apparatus when a failover event occurs. The secondary security apparatus further includes means for sharing flow information among a group of devices. The system further comprises means for sharing flow records from the primary security apparatus to the secondary security apparatus.

The details of one or more implementations of the invention are set forth in the accompanying drawings and the description below. Other features and advantages of the invention will become apparent from the description, the drawings, and the claims.

DESCRIPTION OF DRAWINGS

Like reference numbers and designations in the various drawings indicate like elements.

DETAILED DESCRIPTION

Figure 1:
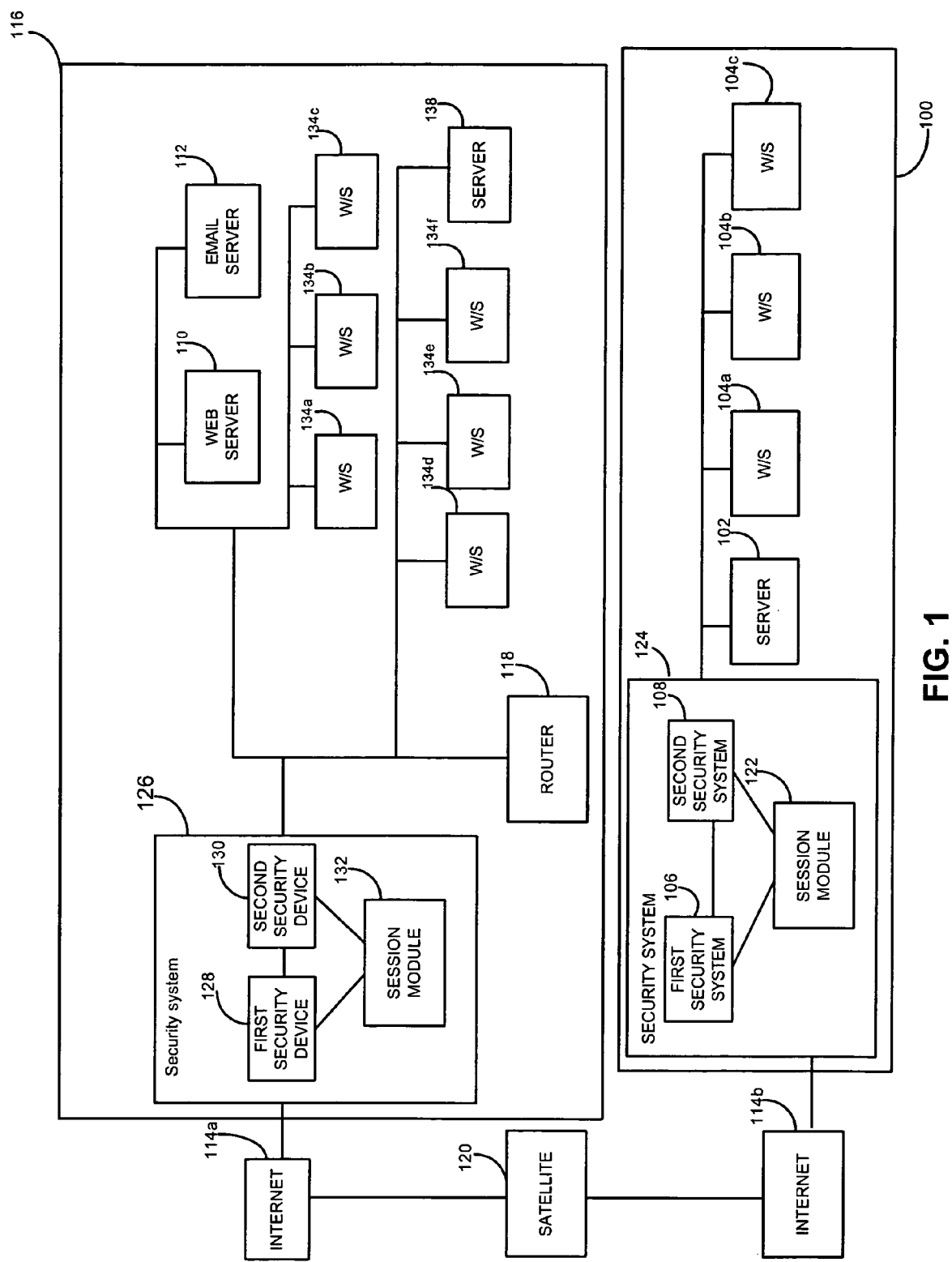
FIG. 1 shows a network topology including a session module.

FIG. 1 shows an exemplary network topology including a local area network (LAN) 100, including a server 102, several workstations (W/S) 104a-104c (collectively, "104"), and a security system 124. The security system 124 may include a session module 122 and a group of other security devices. In the implementation shown, security system 124 may include two security devices, a first security device 106 and a second security device 108. LAN 100 may be connected to an external network e.g., the Internet 114b, through security system 124. LAN 100 may also be connected to a second LAN 116 through an external network, e.g., Internet 114a. Second LAN 116 may include a web server 110, an email server 112, a server 138, several workstations 134a-134f (collectively, "134") and a security system 124. LAN 116 is connected to Internet 114a via security system 126. Security system 126 may include a first security device 128, second security device 130, and session module 132. The computers, servers and other devices in the LAN may be interconnected using a number of data transmission media such as, for example, wire, fiber optics, and radio waves. Security system 124 and security system 126 may operate in a similar manner. Using security system 124 by way of example, session module 122 may monitor packets being communicated within the network. In one implementation, first security device 106 may be a firewall and second security device 108 may be an IPS. Session module 122 may act in conjunction with first security device 106 and second security device 108 to facilitate blocking of packets associated with an attempted network security intrusion.

Figure 2:
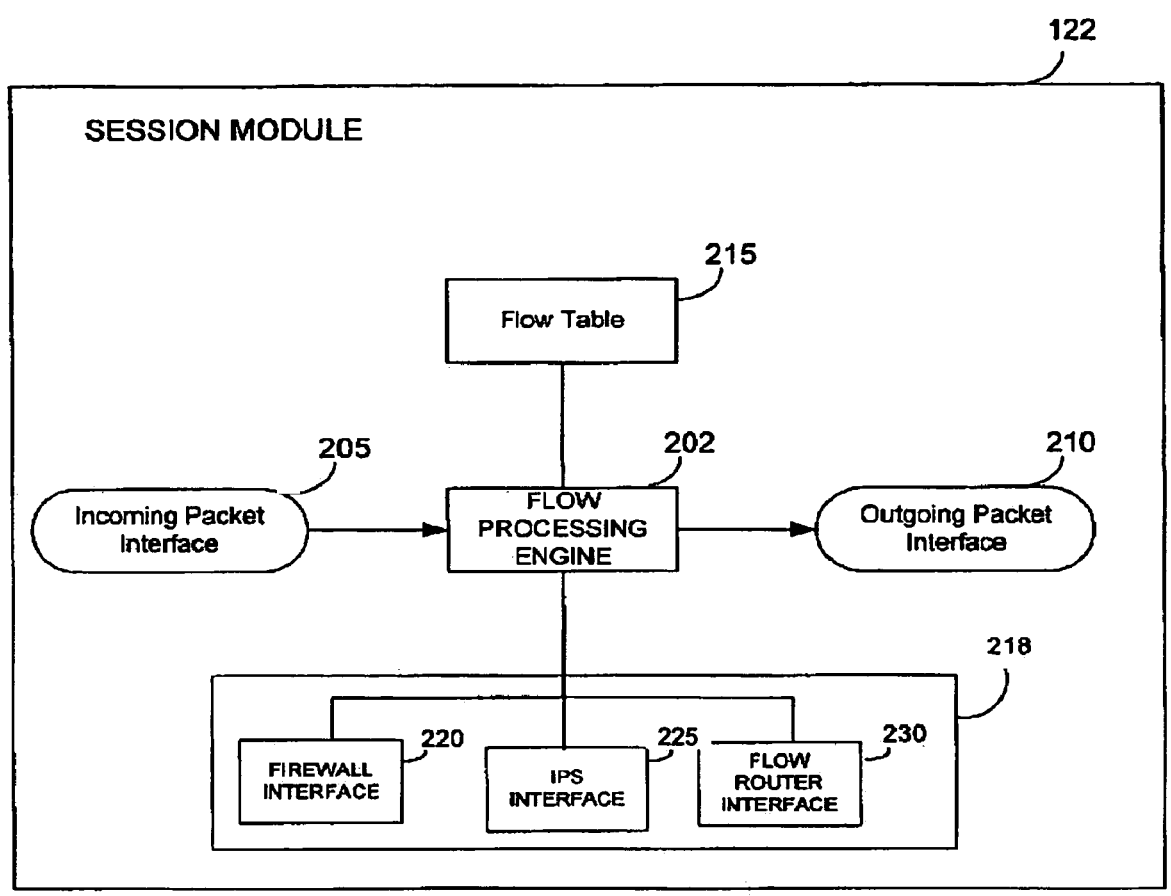
FIG. 2 illustrates a block diagram of the session module.

FIG. 2 shows a block diagram of an exemplary session module, such as session module 122. Session module 122 may include an incoming packet interface 205 for receiving packets. Session module 132 may operate in a similar manner. The received packets may be analyzed by a flow processing engine (FPE) 202 to determine if an attempted network security intrusion is in progress. Session module 122 may also include a flow table 215. Flow table 215 may be used to store information regarding flows associated with received packets. Session module 122 may also include interfaces to other security devices on the network. In one implementation, session module 122 may include a firewall interface 220, an IPS interface 225, and a flow-based router interface 230. Security device interfaces 218 may be used by session module 122 to obtain information regarding the received packet, and information regarding the flow associated with the packet, in order to determine if the received packet should be allowed or modified. Security device interfaces 218 may also be used by session module 122 to communicate flow information that may be used by the security devices to facilitate processing of the packet.

Figure 3:
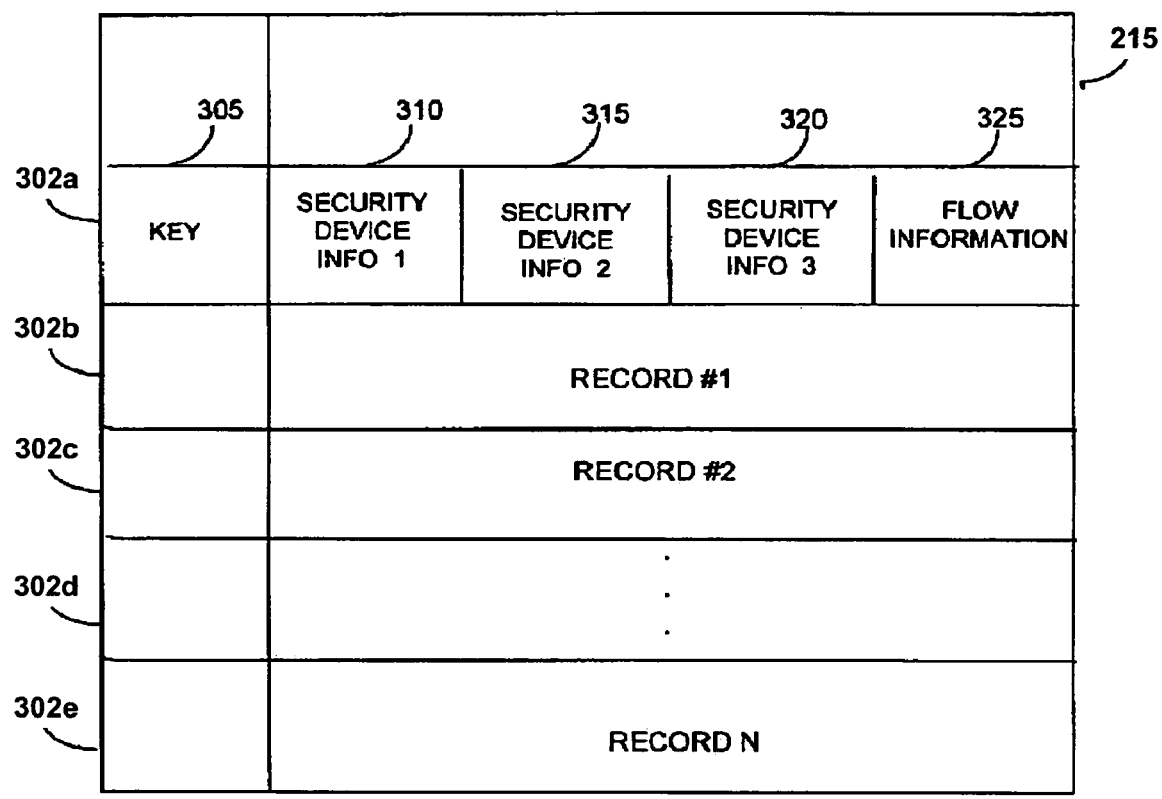
FIG. 3 shows the structure of a flow table.

FIG. 3 illustrates a structure of a flow table 215 that may be used in implementations consistent with the principles of the invention. Flow table 215 may include flow records 302a-302e (collectively, "302") associated with current TCP/IP flows. A TCP/IP flow may include a sequence of data packets communicating information between a source and a destination in one direction. The flow records may be indexed using an indexing key 305. Indexing key 305 may be used to store and retrieve the appropriate flow record associated with a received packet. In one implementation, indexing key 305 may be a hash key and flow table 215 may be implemented as a hash table. Session module 122 (FIG. 2) may store instructions for two or more security devices on the network in the same flow record. In one implementation of session module 122, instructions for three security devices (e.g., devices 310, 315, and 320) may be stored in flow records 302. Flow records 302 may store policy information (e.g., firewall policy, IPS policy etc., to apply to the flow) as well as other information that may be used by the security devices such as encryption parameters, address translation parameters, bookkeeping information, and statistics. Flow records 302 can also include flow information 325 for use by session module 122 in order to decide whether the packet should be allowed. Such information can include information required to implement network policies regarding, for example connection time out, time billing, and bandwidth usage. Flows, sessions and flow tables are described in greater detail in a co-pending and commonly owned patent application entitled "Multi-Method Gateway-Based Network Security Systems and Methods," and assigned U.S. patent application Ser. No. 10/072,683, the contents of which are herein incorporated by reference in its entirety.

Figure 4:
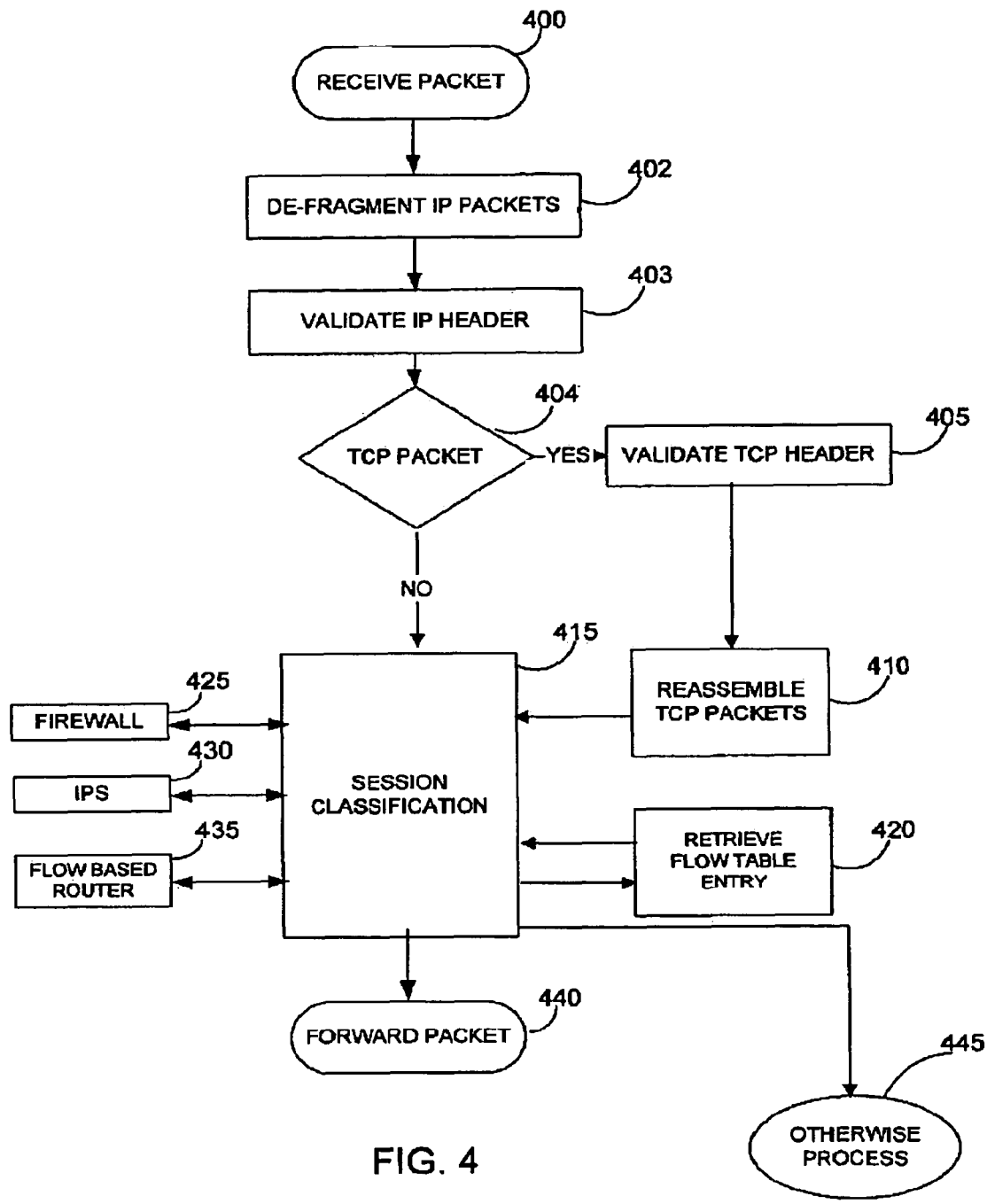
FIG. 4 is a flowchart describing the operation of the session module.

FIG. 4 a flowchart that describes exemplary operation of FPE 202 (FIG. 2) in an implementation consistent with the principles of the invention. Incoming packets may be received by session module 122 (act 400). IP packets may be de-fragmented (act 402) and the IP header may be validated for each IP packet (act 403). During act 403, the IP header associated with a given packet may be extracted and inspected for fundamental flaws.

If the packet is a TCP packet (act 404), the TCP header may be validated (act 405) and the TCP packets may be reassembled (act 410). The validation process may include extracting TCP header data and evaluating the header for fundamental flaws. Quasi-reassembly information developed in act 410 may be communicated by session module 122 to other security devices to facilitate processing of the packet by the other security devices. Reassembly is described in greater detail below and in U.S. patent application Ser. No. 10/072,683.

In act 415, FPE 202 may perform session classification using the TCP/IP header data associated with a given received packet. Session module 122 may determine if the packet should be allowed based on information obtained regarding the TCP/IP flow associated with the received packet and retrieved from flow table entry (act 420). In addition, session module 122 may use information returned from one of the other security devices e.g., a firewall (act 425), an IPS (act 430), and a flow based router (act 435). Further, session module 122 may also facilitate the operation of the security devices by communicating flow information to a respective device for processing a given packet. Finally, FPE 202 may forward the packet if the packet should be allowed (act 440). Otherwise, the packet is otherwise processed (act 445). Otherwise processing may include logging particular information regarding the packet, holding the packet, or modifying and/or dropping the packet.

Figure 5:
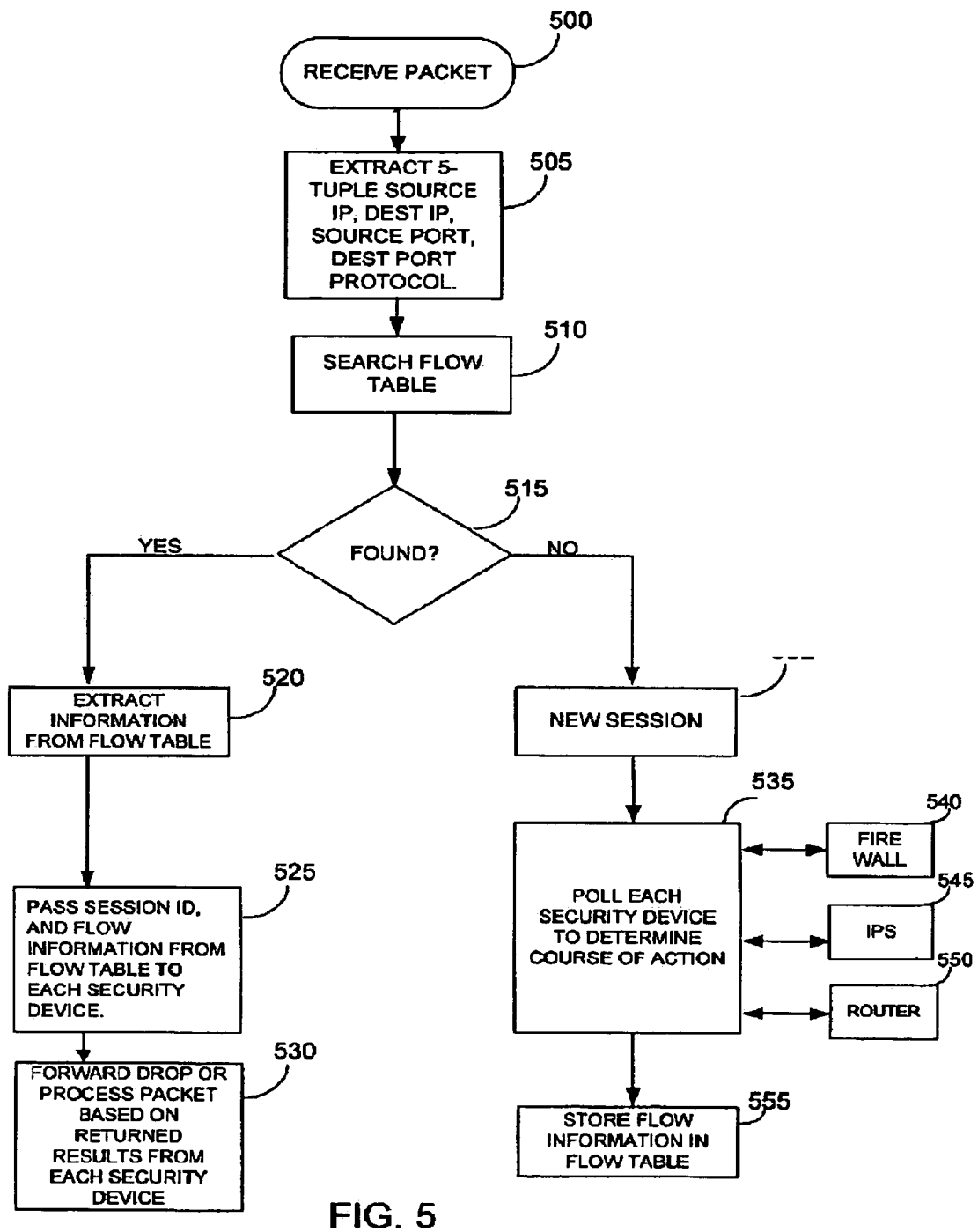
FIG. 5 is a flowchart describing session classification.

FIG. 5 is a flowchart that illustrates exemplary processing that may be included in session classification (act 415 of FIG. 4). The session classification act may receive a packet (act 500) and extract information that may be used to determine whether the packet should be allowed. The extracted information may include source and destination IP addresses, source and destination port numbers, and a protocol (act 505). The extracted information may be used to search flow table 215 (act 510) in order to determine if the packet is associated with a known session flow. For a known session flow, act 510 may produce a matching flow record in flow table 215 (act 515). If a matching flow record is found, FPE 202 (FIG. 2) may extract TCP/IP session information for the received packet (act 520) from the matching flow record. FPE 202 may determine whether the received packet should be allowed using the TCP/IP session information obtained during act 520. More specifically, FPE 202 may extract information from the matching flow record, and may pass the information to the security devices (e.g., communicating the session ID and the TCP/IP session information as well as any other security device specific information from the flow record) (act 525). Depending on the returned results from the security devices, FPE 202 can forward, drop, log, store, modify or otherwise process the given packet (act 530).

If a matching flow record is not found in flow table 215 during act 515, the received packet may be associated with a new TCP/IP session (act 532). For a new TCP/IP session, FPE 202 may assign a session ID to the new session and FPE 202 may communicate with the other security devices (e.g. firewall, IPS, flow router) to determine a security policy for packets associated with the new session. For example, FPE 202 may obtain information from a firewall (act 540) in order to determine if received packets associated with the new session should be allowed. FPE 202 may communicate with an IPS (act 545) in order to determine if the received packet should be blocked because it matches known attack signatures for attempted network security intrusions. FPE 202 may obtain any network policy associated with the new session from a flow router (act 550). FPE 202 may act as an arbiter between the different security devices and use the information obtained from the security devices either individually or in combination to determine if the packets associated with the new TCP/IP session should be allowed. FPE 202 may use the information obtained from the security devices to create a new flow record and may store the new flow record in flow table 215 (act 555). The new flow record may include the TCP/IP session information for the new session associated with the received packet and any other specific security device information. Thereafter, FPE 202 may facilitate the processing of received packets associated with a given TCP/IP session as described above in association with FIG. 4 including communicating the session ID, TCP/IP session information and security device specific information to the security devices from a corresponding flow record.

Figure 6:
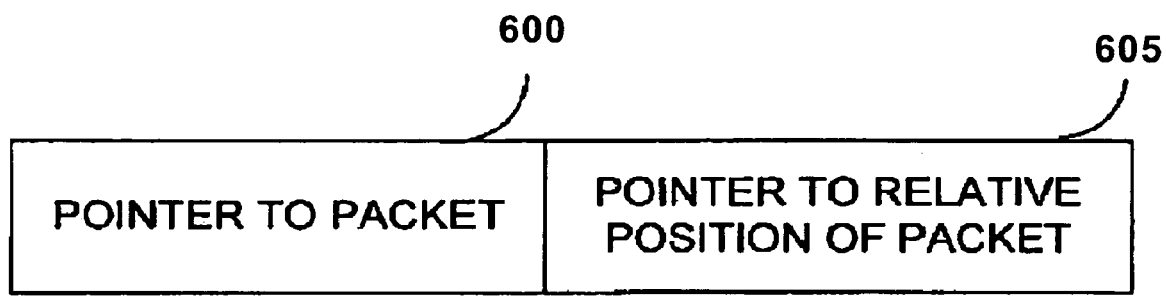
FIG. 6 shows the quasi-reassembly information generated by the session module.

In addition to determining if a received packet is associated with an attempted network security intrusion using the varied security devices, session module 122 (FIG. 2) may also perform quasi-reassembly of the received TCP/IP packets as described above in association with FIG. 4. FIG. 6 shows exemplary quasi-reassembly information that may be generated by session module 122. The quasi-reassembly information may include a pointer to a location of a given packet 600 in memory and a pointer to information including a relative position of the packet in a flow 605. In one implementation, an IPS may perform passive TCP/IP reassembly and pointer to the location of the packet 600 may be used to locate the packet within the IPS. In another implementation, pointer to information containing the relative position of the packet in the flow 605 may be used to obtain the TCP/IP sequence number included in the TCP/IP header associated with the packet. The quasi-reassembly information may be communicated to the security devices connected to session module 122 (FIG. 2). The security devices may use the quasi-reassembly information to process the received packet.

Figure 7:
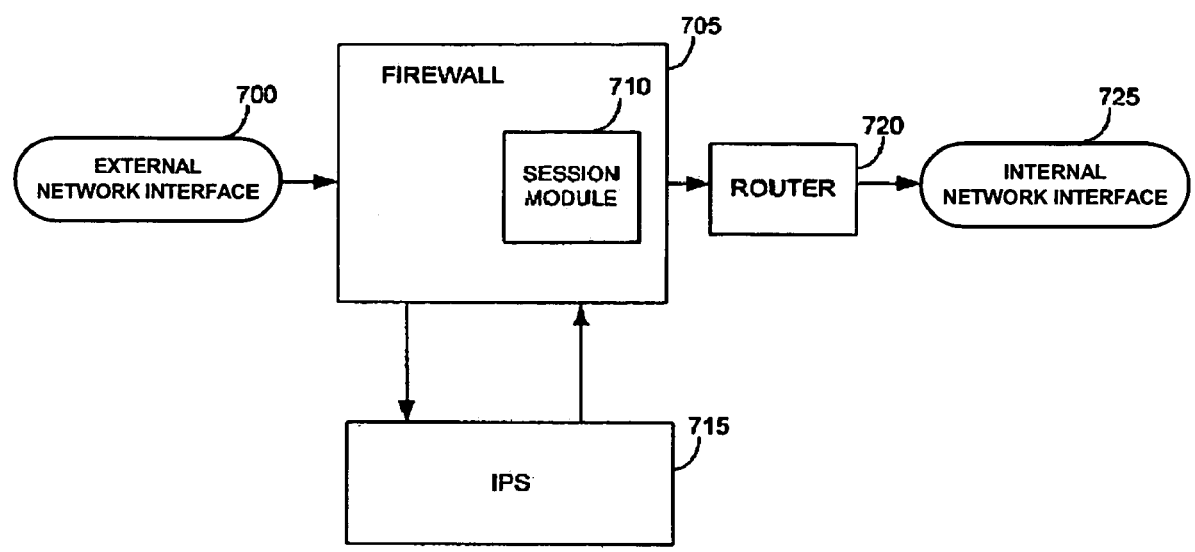
FIG. 7 shows a network topology where the session module is included in a firewall.

Session module 122, described above, may be used in a number of different network topologies. FIG. 7 shows a network topology where a session module 122 is integrated into a firewall 705. Firewall 705 may include an interface to a router 720 and an IPS 715. Firewall 705 may receive packets from an external network interface 700. Firewall 705 may communicate with IPS 715 to determine whether the received packet should be blocked based on known attack signatures. If firewall 705 and IPS 715 determine that the packet should be allowed to pass, firewall 705 may send the received packet to router 720. Router 720 may forward the outgoing packet to its intended destination, using an internal network interface 725, based on the network policies stored in the router.

Figure 8:
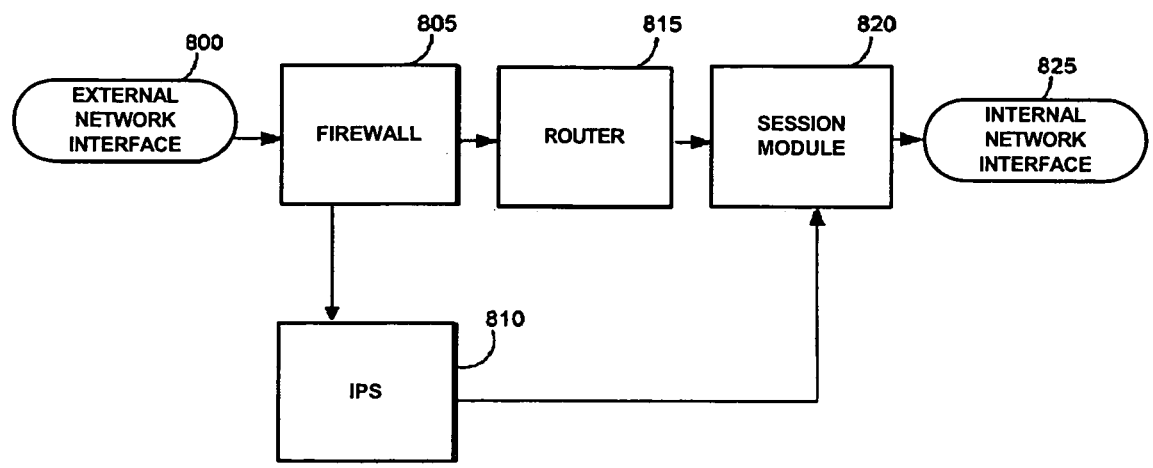
FIG. 8 shows a network topology where the session module operates in series with a firewall, IPS, and router.

FIG. 8 shows an exemplary alternate arrangement for implementing computer network security using session module 122. In this arrangement, session module 820 may operate in series with a firewall 805, an IPS 810, and a router 815. Packets received using an external network interface 800 may be screened by firewall 805 before being communicated to router 815. Firewall 805 may also send information regarding the received packet to IPS 810. IPS 810 may examine the received packet and may inform session module 820 if the received packet should be blocked based on known attack signatures. Router 815 may send the packet to session module 820 for further processing. If session module 820 determines that the received packet should be allowed it may forward the received packet to its intended destination using an internal network interface 825.

Figure 9:
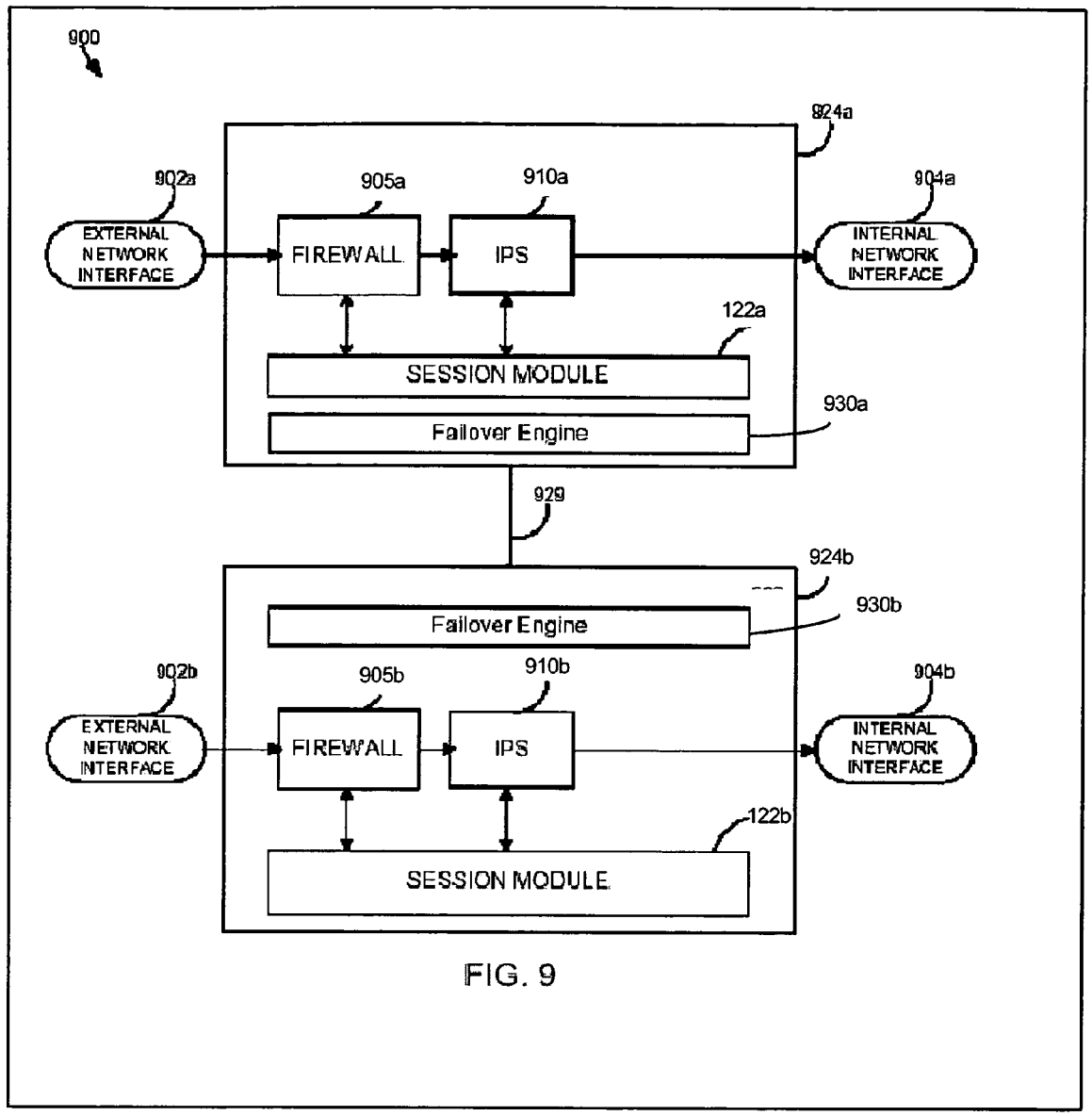
FIG. 9 shows a network topology where a session module, firewall, IPS and router are included in a single security device.

FIG. 9 shows an exemplary high availability arrangement for implementing computer network security using session module 122. In this arrangement, a network topology may include a local area network (LAN) 900, including external network interfaces 902a, internal network interfaces 904a, and a first security system 924a. First security system 924a may include session module 122a and a group of other security devices. In the implementation shown, first security system 924a includes two security devices, a firewall device 905a and an IPS device 910a. In other implementations, first security system 924a may include more or fewer security devices, such as, for example, one firewall 905a and no IPS. LAN 900 may be connected through first security system 924a to an external network e.g., the Internet, by external network interface 902a. LAN 900 may also be connected through a second security system 924b to an external network e.g., the Internet, by external network interface 902b. Second security system 924b may include session module 122b and a group of security modules. In the implementation shown, second security system 924b may include two security devices, a firewall 905b and an IPS device 910b and an internal network interface 904b. In other implementations, second security system 924b may include more or fewer security devices, such as, for example, one firewall 905b and no IPS. First and second security devices 924a/b may be identically configured. First and second security systems 924a/b may be connected via a link 929. Link 929 may be a secure link. Link 929 may be an internal link to LAN 900 or alternatively, a link that is part of an external network. Second security system 924b may be directly coupled to an external network, e.g., the Internet, using external network interface 902b. Alternatively, second security system 924b may be coupled to the external network through first security system 924a. Similarly, first and second security systems 924a/b may share a single internal network interface. Computers, servers and other devices in the LAN 900 may be interconnected using a number of data transmission media, including, but not limited to wire, fiber optics, and radio waves.

Other configurations for a high availability network topology are possible. In each configuration, second security system 924b may act at failover to support traffic processed by first security system 924a. In one implementation consistent with the principles of the invention, second security system 924b may be provided by a pool of security systems. In the pool, at least one security system may be identified as a primary failover system. One or more other security systems in the pool may be identified as secondary failover systems. Each of the second security systems may be passive (i.e., idle until a failover event) or actively processing packets in support of its own network requirements. In one implementation consistent with the principles of the invention, a first and second security system may each provide failover protection for the other. In such an implementation, failover data may be exchanged between the two security systems. The operation of the security systems prior to, and in support of, failover is discussed in greater detail below.

In a high availability implementation shown in FIG. 9, second security system 924b may be configured to operate at failover of first security system 924a. Failover may arise when either first security system 924a, or links to first security system 924a, fail in the network topology. Failover may be detected by a failure to receive a keep-alive signal, data or other status information by second security system 924b. In one implementation consistent with the principles of the invention, first security system 924a may include a failover engine 930. Failover engine 930 may be operable to transmit failover data to another security system (e.g., second security system 924b) so as to synchronize the two security systems. In one implementation consistent with the principles of the invention, the failover data may include data from flow table 215 (part of session module 122) associated with a respective security system (e.g., first security system 924a). More specifically, after failover, a second security system (e.g., second security system 924b) may receive packets for routing and processing ordinarily (i.e., but for the failure) destined for processing by the first security system (e.g., first security system 924b). Some of the packets received relate to sessions that have previously been processed and identified in the first security system. Sharing the flow information prior to failover may allow the second security system to seamlessly process packets for existing flows as they are received. Conventional systems that do not share flow information prior to failover may be required to drop all packets that relate to existing sessions (i.e., sessions that were current at the time of failover) or, alternatively, repeat processing steps.

As described above, session module 122a within first security system 924a may monitor packets being communicated within the network. Session module 122a may act in conjunction with firewall device 905a and IPS device 910a to facilitate blocking of packets associated with attempted network security intrusions.

A failover engine 930 of secondary security system 924b (FIG. 9) may operate to detect a failure in one or more primary security systems (e.g., the first security system) for which a given security system may be designated to act as a failover device. Failover engine 930 may operate to detect failures in the links or operation of a given primary security system. In one implementation consistent with the principles of the invention, a given security system may act as a failover system for a one or more other security systems. Failover engine 930 may control receipt of and update of information for flow table 215 in a respective device. More specifically, failover engine 930 may be operable to provide synchronization information from a primary security system to a secondary security system, update the synchronization information over time, detect the failure of the primary security system and initiate the processing of packets in the secondary security system for packets that otherwise would have been processed by the primary security system but for the detected failure.

Figure 10:
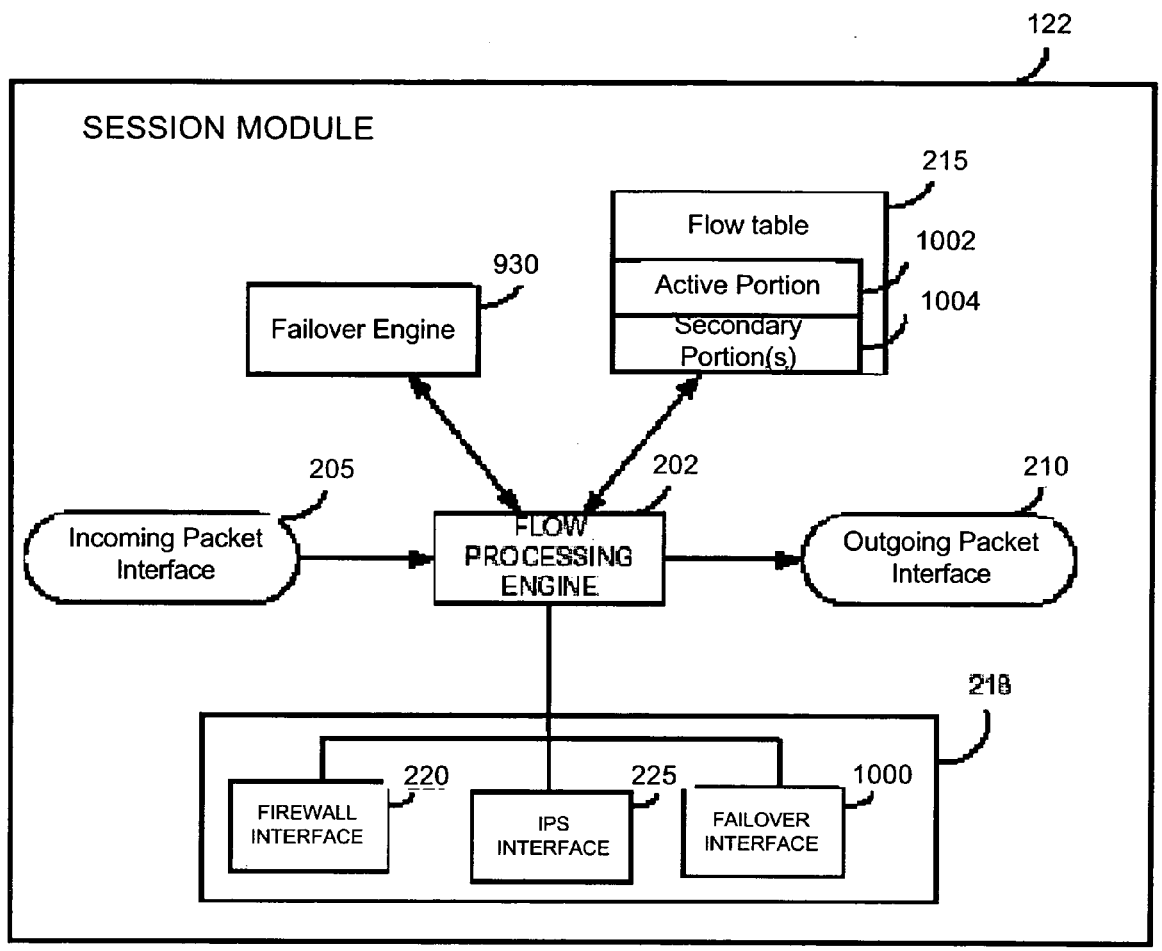
FIG. 10 shows a network topology where a group of security devices is included in a high availability architecture.

Referring now to FIG. 10, another implementation of session module 122 is illustrated. This implementation of session module 122 may include incoming packet interface 205 for receiving packets. The received packets may be analyzed by flow processing engine (FPE) 202 to determine if an attempted network security intrusion is in progress. Session module 122 may also includes flow table 215. Flow table 215 may be used to store information regarding flows associated with received packets. Flow table 215 may include a primary or active portion 1002 and a secondary portion 1004. Primary portion 1002 may be that portion of the flow table dedicated to store information related to the operation of the given session module as a primary security system (e.g., store flow information for which the session module is actively participating in the processing of the packets). Secondary portion 1004 may be that portion of the flow table dedicated to store information related to the operation of the given session module as a secondary security system (e.g., failover/synchronization information for flows that the session module may process in the event of a failover). In one implementation, the primary and secondary portions 1002 and 1004 may be integrated in flow table 215. In another implementation, flow table 215 may store multiple secondary portions corresponding to multiple primary security systems for which a given session module may be providing failover support.

Session module 122 may also include interfaces to other security devices on the network as well as one or more interfaces to other security systems. In one implementation consistent with the principles of the invention, session module 122 may include a firewall interface 220, an IPS interface 225, and a failover interface 1000. The security device interfaces are used by session module 122 to obtain information regarding the received packet, and information regarding the flow associated with the packet, in order to determine if the received packet should be allowed or modified. The security device interfaces may also be used by session module 122 to communicate flow information that the security devices may use to facilitate processing of the packet. Failover interface 1000 may be used to transmit synchronization information to other security systems in the network.

In one implementation consistent with the principles of the invention, each of the primary and secondary security systems may include session modules 122 that may include failover engine 930. In such an implementation, first security system 924a and second security system 924b (FIG. 9) may not have a separate failover engine 930 outside of session module 122.

The processing steps for the first security system (i.e., a primary security system that operates to conventionally pass packets) may include the initialization of a flow table 215 in session module 122 (act 1102). After initialization, failover engine 930 may identify information reflecting the initial/current state of the flow table 215 (act 1104) and may pass the information to a second security system through failover interface 1000 (where it is stored, e.g., in secondary portion 1004) (act 1106). After initialization, session module 122 for the first security system may analyze packets and develop further session and other information that is stored in or deleted from flow table 215 as described above with respect to FIGS. 3-5 (act 1108). At predetermined times, failover engine 930 may provide information from flow table 215 to one or more second security systems through failover interface 1000 (act 1110). This process may repeat so as to maintain a current copy of information from flow table 215 in the second security systems (e.g., in respective secondary portions of flow table 215).

In one implementation, flow table 215 may be copied and provided in its entirety to the second security system at predetermined times. In an alternative implementation, only portions of flow table 215 may be copied. In one implementation, a message is sent each time a session is created or torn down in the first security system. In one implementation, time-out information may be provided for each new session. In this implementation, a refresh message may be sent to each second security system whenever an associated timer in the first security system is reset (i.e., refreshing the timers in the second security systems). Alternatively, no time-out information may be sent with the session information passed to the second security systems. In this configuration, the second security systems may receive refresh messages at set-up and tear down of sessions in the first security system.

In one implementation, time-out information may be provided for each new session created. In the second security systems, the time-out function may be disabled (i.e., the second security systems will not delete the session from the flow table after the time-out period has expired). In one implementation, only when a second security system takes over packet processing after a failover may the timers be activated for the traffic associated with the first security system.

The processing acts for the second security system (e.g., the security system that operates to process packets from the first security system at failover) may include the initialization of flow table 215 in session module 122 of second security system (act 1122). Information reflecting the initial state of flow table 215 may be received by the second security system through failover interface 1000 (act 1124) and stored in secondary portion of flow table 215 (act 1126). The second security system may continue to receive updates from the first security system at predetermined intervals (act 1128) and flow table 215 may be updated (act 1126). When a failover is detected by failover engine 930 (act 1130), session module 122 for the secondary security system may initialize flow table 215 (act 1132). Failover may be detected by an external entity or by the second security system. Packets may be provided to both the first and the second security system for processing. However, the second security system may be configured to not process packets unless a failover has been detected. Failover detection may be detected by ping or keep-alive signals. In one implementation, the first security system may provide a keep-alive signal to the second security system. Alternatively, the second security system may ping the first security system intermittently to determine whether the first security system is operational. In another implementation, external entities may monitor the operation of the first security system. Upon detection of a fault in either the first security system or the connection paths associated therewith, a take-over signal can be generated and passed to an appropriate second security system.

Initializing flow table 215 in the second security system may include activating an appropriate secondary portion 1004 of flow table 215. Initialization may include the reordering of flow table 215 to integrate records of the primary and secondary portions 1002 and 1004 respectively (e.g., if the second security system is actively supporting other packet processing prior to failover). In one implementation, each record may include a label indicating to which security system the record belongs. The label may be used to easily clear records from the primary portion of the flow table of the second security system in the event the primary security system is recovered. Thereafter, session module 122 in the second system may begin to receive and analyze packets (developing further session and other information that is stored in/deleted from flow table 215) as described above with respect to FIGS. 3-5 (act 1134). At predetermined times, failover engine 930 of session module 122 may provide information from flow table 215 to one or more third security systems through its failover interface 1000 (act 1136). Update information may be provided at predetermined intervals to the third security system(s) so as to maintain a current copy of information from flow table 215 in the one or more third security systems. In one implementation, flow table 215 may be copied and provided in its entirety to the one or more third security systems at predetermined times. In an alternative implementation, only portions of flow table 215 may be copied. In one implementation, the process may continue to operate on packets until a predetermined event occurs. The predetermined event may be the recovery from the failure in the first security system.

Figure 11A:
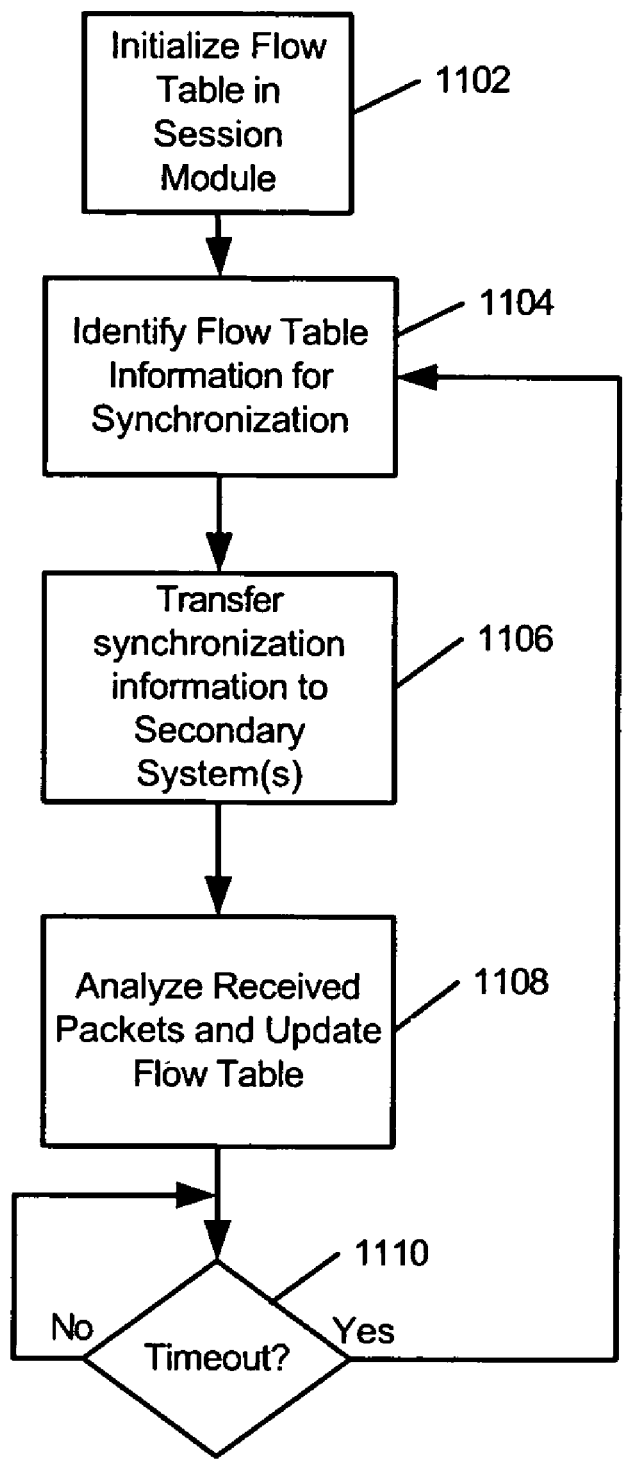
FIG. 11a-c illustrate processes for providing failover protection in the network topology of FIG. 10.
Figure 11B:
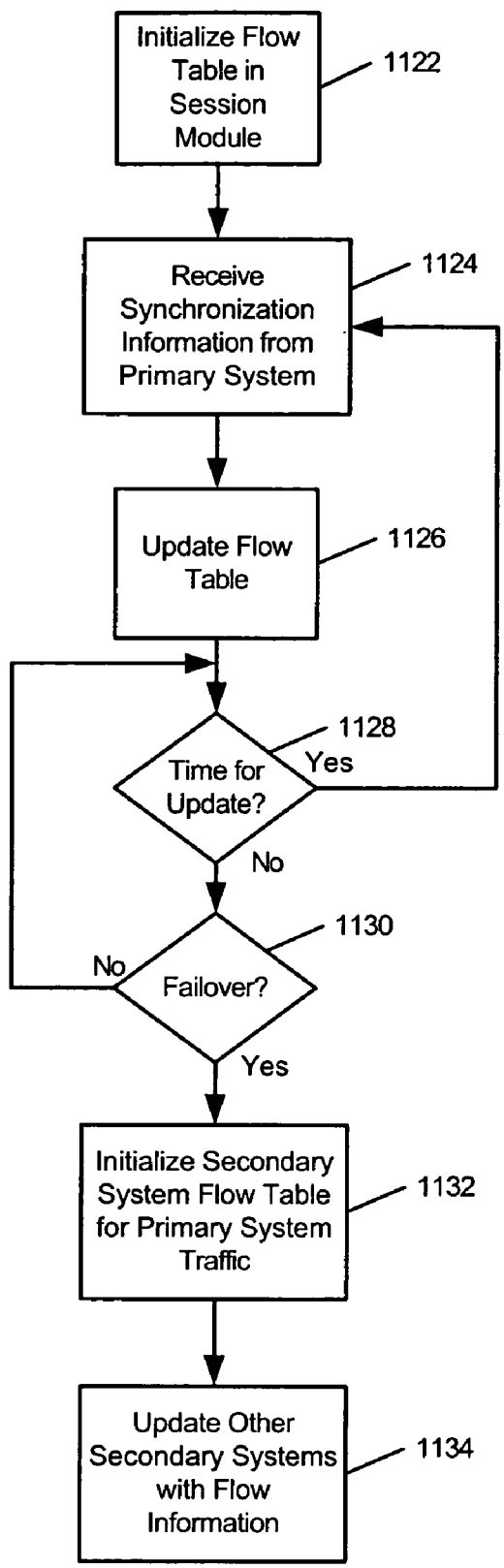
Figure 11C:
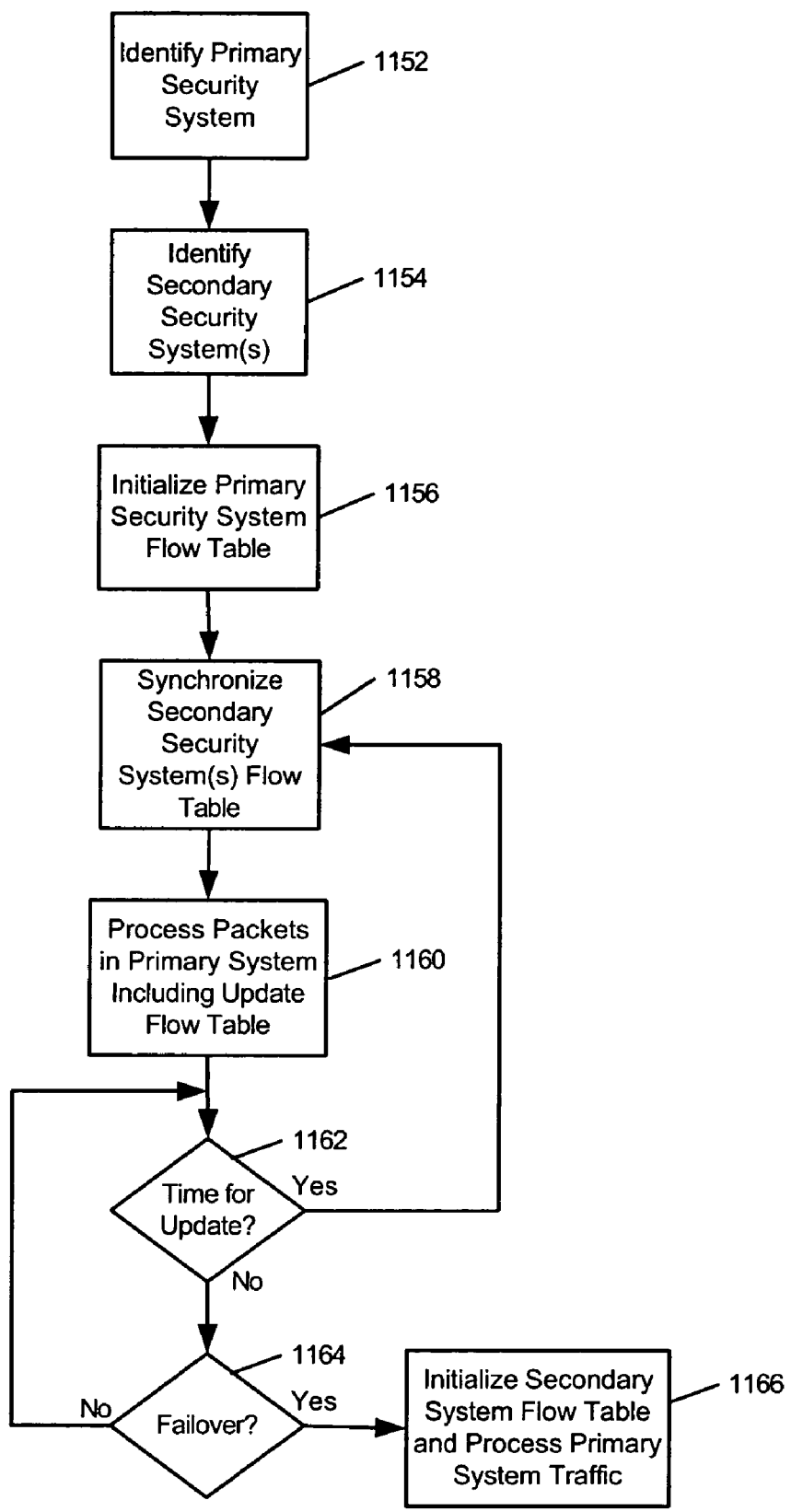

Referring now to FIG. 11c, a process for providing high availability in a security network is shown. A primary security system may be identified (act 1152) and one or more secondary security systems may be identified (act 1154). The primary security system may be a security system that operates to process packets that the primary security system receives until a failover event occurs. Failover may include failure of the primary security system as well as links from the primary security system to the network. The secondary security systems may be designated as available for processing the load of packets associated with the primary security system after a failover event. In one implementation, one secondary security system may be identified. In an alternative implementation, a pool of secondary security systems may be identified. In one implementation of the pool, one secondary system may be designated as a master and one or more other secondary security systems may be designated as slaves. At failover, the master security system may act to process packets of the failed primary security system. The slaves may operate to take the place of the master upon failure of the master device.

Returning to the high availability process, the primary security system may initialize flow table 215 (act 1156) and the initial configuration of the flow table may be passed to the secondary security system(s) (act 1158). Packets may be conventionally processed by the primary security system and flow table 215 may be updated accordingly (act 1160). At predetermined times, flow table 215 from the secondary system may be updated with information from the primary security system (act 1162). When a failover event is detected (act 1164), the secondary security system may initialize flow table 215 in the secondary system and may begin to process packets routed to the primary security system (act 1166). In one implementation, upon correction of the failover event, the primary security system may be reinitialized, including updating flow table 215, and packet processing may be resumed by the primary security system.

Where as described above with respect to FIG. 9, the primary and secondary security systems include multiple security devices (e.g., a firewall and IPS), no separate synchronization of the individual devices may be required. Accordingly, the amount of data to be passed between the respective devices is minimized. Further, reliability may be increased with the minimization of information that is to be passed. In the configuration shown in FIG. 9, each of the security devices may share information in unified flow table 215. Other processing efficiencies can be realized in the secondary security system. For example, at failover, packets that were previously identified as being part of a recognized flow may bypass processing by the IPS. In one implementation, two security systems may act as failover devices for each other (e.g., first system acts as failover for the second system and visa versa). In other implementations, the failover security system may be a conventional system (i.e., no shared flow information among devices) and the flow information that is received by the failover security system may be shared with multiple devices.

Embodiments consistent with the principles of the invention may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method acts of the invention may be performed by one or more programmable processors executing a computer program to perform functions of the invention by operating on input data and generating output. Method acts may also be performed by, and apparatuses may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor may receive instructions and data from a read-only memory or a random access memory or both. The essential elements of a computer are a processor for executing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. Information carriers suitable for embodying computer program instructions and data may include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Embodiments consistent with the principles of the invention may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation of the invention, or any combination of such back-end, middleware, or front-end components. The components of the system may be interconnected by any form or medium of digital data communication, e.g., a communication network. Examples of communication networks include, for example, a local area network ("LAN") and a wide area network ("WAN"), e.g., the Internet.

The computing system may include clients and servers. A client and server may be remote from each other and may interact through a communication network. The relationship of client and server arises by virtue of computer programs running on the respective computers and having a client-server relationship to each other.

This invention has been described in terms of particular embodiments. Nevertheless, it will be understood that various modifications may be made without departing with the spirit and scope of the invention. For instance, the steps of the invention may be performed in a different order and still achieve desirable results. In addition, the session module, IPS, firewall, and router may all be incorporated into a single device such as the configuration shown in FIG. 9. Other configurations of a session module packaged with one or more security devices are also possible. Accordingly, other embodiments are within the scope of the following claims.

What is claimed is:

1. A method in a computer network, comprising:
processing packets, by a primary security system, the primary security system including a first device-implemented session module to maintain flow information for the primary security system to facilitate processing of the packets, where the first device-implemented session module includes a first flow table having a primary portion that stores information associated with the operation of the first device-implemented session module, when the primary security system is functioning in a primary security system mode, and a secondary portion that stores information associated with the operation of the first device-implemented session module, when the primary security system is functioning in a failover mode;
designating a secondary security system for processing packets upon a failover event, the secondary security system including a second device-implemented session module to maintain flow information for the secondary security system to facilitate processing of the packets, where the second device-implemented session module includes a second flow table having a primary portion that stores information associated with the operation of the second device-implemented session module, when the secondary security system is functioning in a primary security system mode, and a secondary portion that stores information associated with the operation of the second device-implemented session module, when the secondary security system is functioning in a failover mode;
sharing flow records from the primary security system with the secondary security system;
sharing flow records from the secondary security system with the primary security system;
using the primary security system to provide failover support for the secondary security system, based on the information stored in the secondary portion of the first flow table; and
using the secondary security system to provide failover support for the primary security system, based on the information stored in the secondary portion of the second flow table.

2. The method of claim 1, further comprising:
determining whether the failover event occurred; and
processing a packet by one of the primary security system or the secondary security system for the other one of the primary security system or the secondary security system when the failover event occurs.

3. The method of claim 1, where the failover event includes the failure of one of the primary security system or the secondary security system.

4. The method of claim 1, where the failover event includes a failure of a link from one of the primary security system or the secondary security system to the computer network.

5. The method of claim 2, where the determining is performed at the one of the primary security system or the secondary security system.

6. The method of claim 2, where the determining further comprises:
detecting an absence of a keep-alive signal.

7. The method of claim 2, where the determining further comprises:
monitoring operation of the one of the primary security system or the secondary security system, and
sending a take-over signal to the other one of the primary security system or the secondary security system when the monitoring operation detects a fault.

8. The method of claim 1, where the secondary security system is configured substantially identical to the primary security system.

9. The method of claim 1, where the sharing flow records further comprises:
sharing the flow records between the primary security system and the secondary security system at predetermined intervals.

10. The method of claim 1, where the sharing flow records further comprises:
sharing the flow records between the primary security system and the secondary security system when a refresh message is received by one of the primary security system or the secondary security system.

11. The method of claim 10, where the one of the primary security system or the secondary security system sends the refresh message when a session is set-up or torn down.

12. The method of claim 1, further comprising:
resuming receiving and processing of a packet at one of the primary security system or the secondary security system when a condition that caused the failover event is cleared.

13. A system, comprising:
a processor-implemented primary security system to process packets, the primary security system including a first device-implemented session module to maintain flow information for the primary security system to facilitate processing of the packets, where the first device-implemented session module includes a first flow table having a primary portion that stores information associated with an operation of the first device-implemented session module, when the primary security system is functioning in a primary security system mode, and a secondary portion that stores information associated with an operation of the first device-implemented session module, when the primary security system is functioning in a failover mode; and
a secondary security system to process packets upon a failover event, the secondary security system including a second device-implemented session module to maintain flow information for the secondary security system to facilitate processing of packets, where the second device-implemented session module includes a second flow table having a primary portion that stores information associated with an operation of the second device-implemented session module, when the secondary security system is functioning in a primary security system mode, and a secondary portion that stores information associated with an operation of the second device-implemented session module, when the secondary security system is functioning in a failover mode,
where the primary security system and the secondary security system share flow records, and
where the primary security system is to provide failover support for the secondary security system, based on the information stored in the secondary portion of the first flow table and the secondary security system is to provide failover support for the primary security system, based on the information stored in the secondary portion of the second flow table.

14. The system of claim 13, where
one of the primary security system or the secondary security system is to determine if the failover event has occurred, and
when the failover event is determined to have occurred, one of the primary security system or the secondary security system is to process the packets for the other one of the primary security system or the secondary security system.

15. The system of claim 13, where the failover event includes failure of one of the primary security system or the secondary security system.

16. The system of claim 13, where the failover event includes a failure of a link from one of the primary security system or the secondary security system to a computer network.

17. The system of claim 14, where the one of the primary security system or the secondary security system is to determine if the failover event has occurred by detecting an absence of a keep-alive signal.

18. The system of claim 14, where the one of the primary security system or the secondary security system is to determine if the failover event has occurred by detecting a fault in the one of the primary security system or the secondary security system.

19. The method of claim 13, where the secondary security system is substantially identical to the primary security system.

20. The system of claim 13, where the primary security system and the secondary security share the flow records at predetermined intervals.

21. The system of claim 13, where the primary security system and the secondary security share the flow records when a refresh message is received by one of the primary security system or the secondary security system.

22. The system of claim 21, where the one of the primary security system or the secondary security system sends the refresh message when a session is set-up or torn down.

23. The system of claim 13, where one of the primary security system or the secondary security system resumes receiving and processing of packets when a condition that caused the failover event is cleared.

* * * * *